(12) United States Patent
Kalhous et al.

(10) Patent No.: US 11,912,080 B2
(45) Date of Patent: Feb. 27, 2024

(54) AUTOMATIC HITCH SYSTEM

(71) Applicant: GM GLOBAL TECHNOLOGY OPERATIONS LLC, Detroit, MI (US)

(72) Inventors: Amanda Kalhous, Ajax (CA); Norman J Weigert, Whitby (CA); Radu D. Sotir, Richmond Hill (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 92 days.

(21) Appl. No.: 17/659,585

(22) Filed: Apr. 18, 2022

(65) Prior Publication Data
US 2023/0331051 A1   Oct. 19, 2023

(51) Int. Cl.
*B60D 1/48* (2006.01)

(52) U.S. Cl.
CPC ..................... *B60D 1/48* (2013.01)

(58) Field of Classification Search
CPC ........................................... B60D 1/48
USPC .......................................................... 280/477
See application file for complete search history.

(56) References Cited

U.S. PATENT DOCUMENTS

| | | | | |
|---|---|---|---|---|
| 9,376,063 | B2* | 6/2016 | Hein | B60R 9/06 |
| 2021/0188024 | A1* | 6/2021 | Richards | B60D 1/62 |

\* cited by examiner

*Primary Examiner* — Kevin Hurley
*Assistant Examiner* — Felicia L. Brittman
(74) *Attorney, Agent, or Firm* — Lorenz & Kopf LLP

(57) ABSTRACT

A hitch system for automatically coupling a hitch accessory that has an attachment bar assembly with a hitch receiver. The attachment bar assembly includes a housing bar that is tubular, with a pin-hole through the housing bar. A pin-lever is pivotably mounted in the housing bar and includes a pin configured to retract into the housing bar and to extend out of the pin-hole. A ramp-component is disposed in the housing bar and is engageable with the pin-lever. An actuator selectively moves the ramp-component to retract the pin into the housing bar and to extend the pin out of the housing bar, by selectively enabling pivoting of the pin-lever.

20 Claims, 9 Drawing Sheets

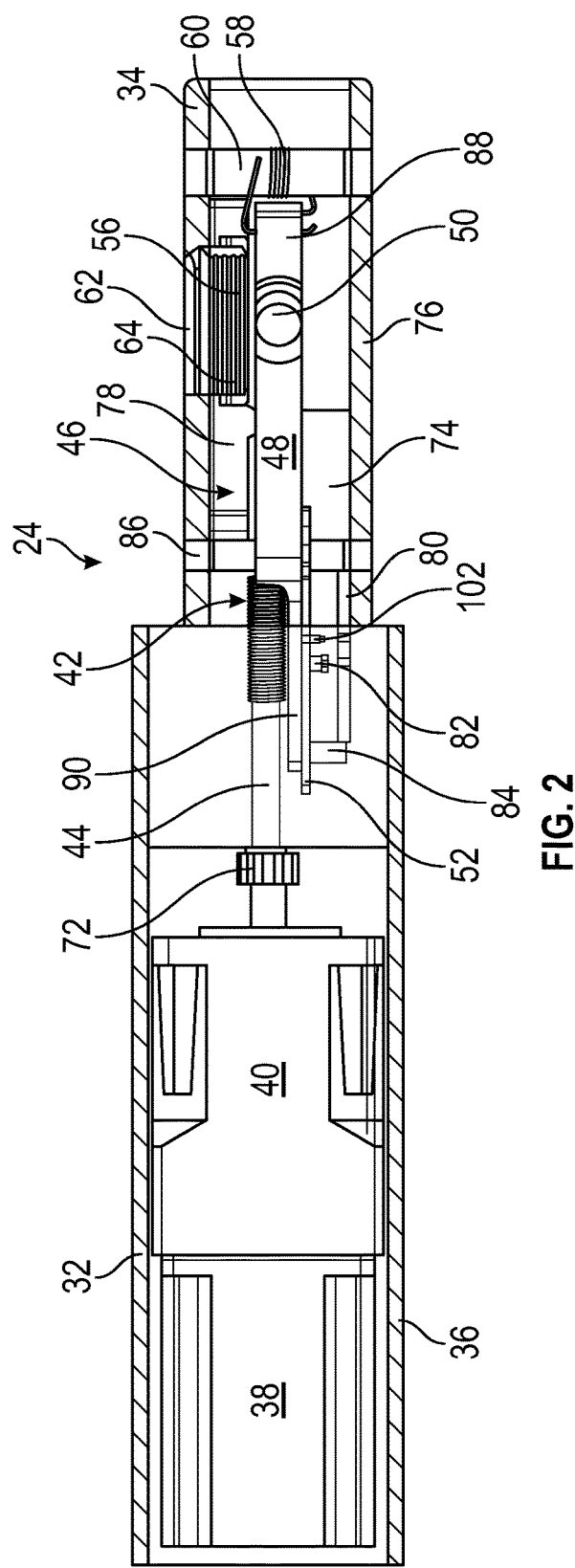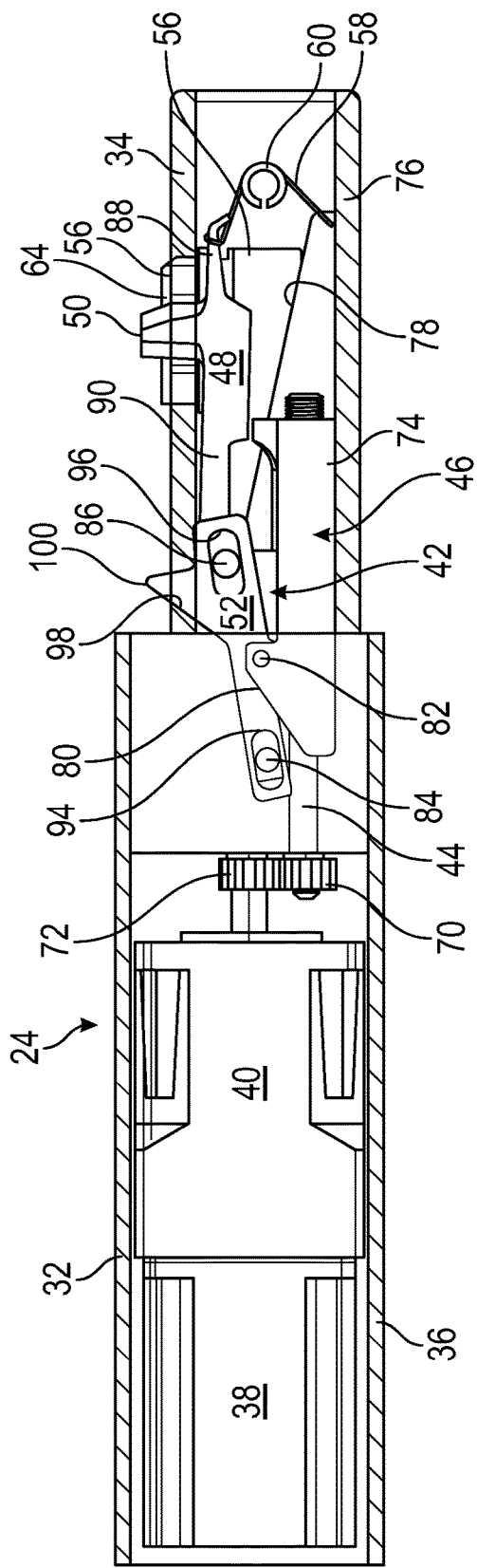

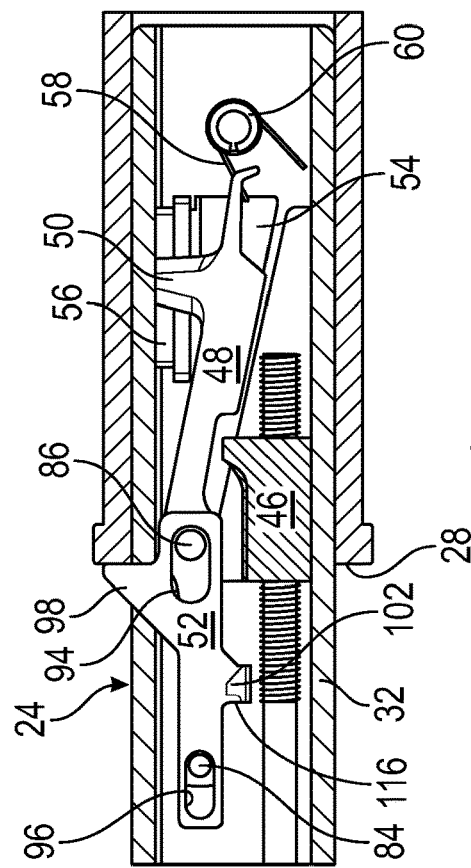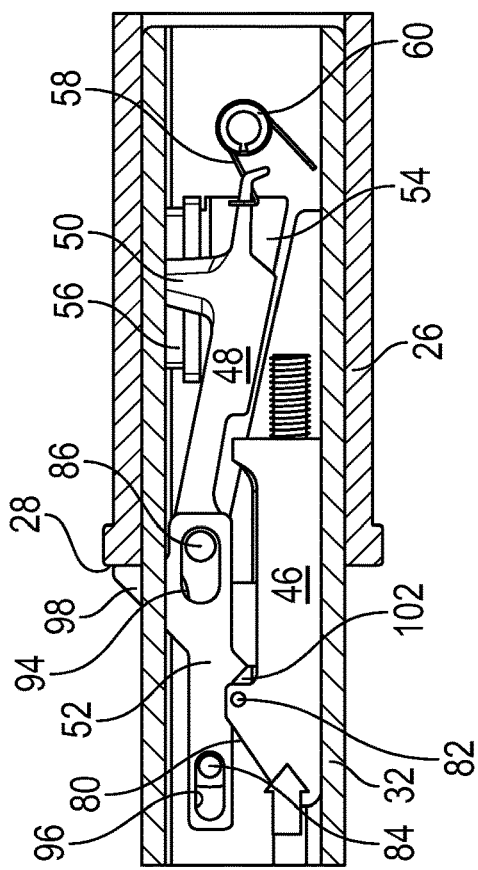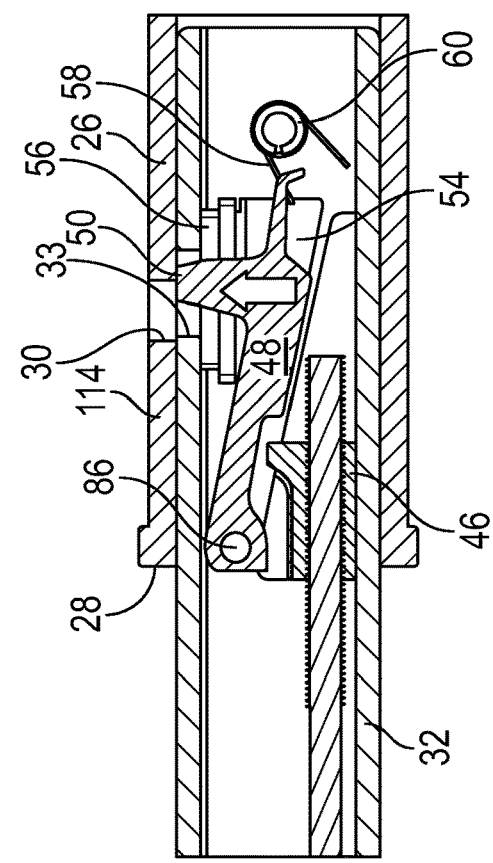

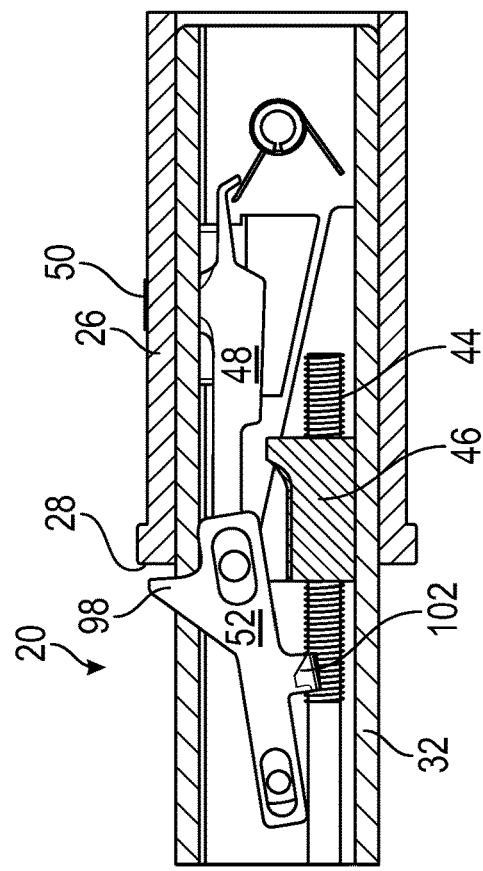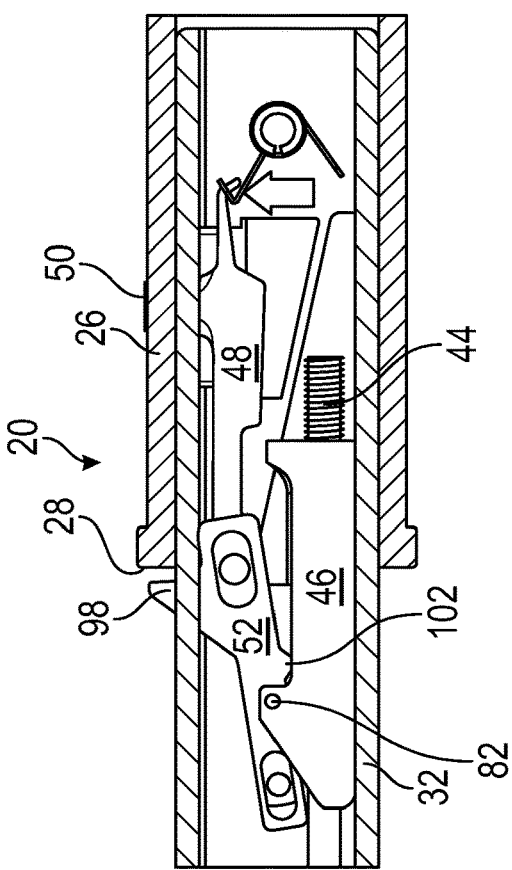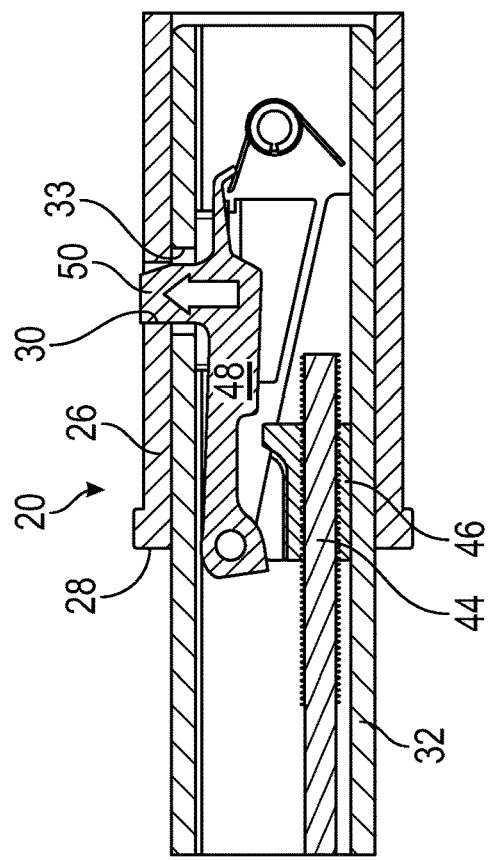

AUTOMATIC HITCH SYSTEM

INTRODUCTION

The present invention relates to hitches and more particularly to hitch systems that automatically couple a cargo carrier with a vehicle.

Motor vehicles of many types are frequently equipped with a hitch receiver for towing and carrying purposes. The hitch receiver is configured to releasably couple with a hitch that is configured for the intended purpose. Hitch receivers are divided into five classes depending on their capacity. A hitch receiver generally includes a receiver tube that performs the receiving function and is connected with the vehicle's structure by a frame. The receiver tube has an opening in a desired shape, which is generally square, and is constructed in a variety of sizes depending on the hitch class. A pin hole generally extends laterally through the receiver tube at a point spaced forward from the receiving end. The specific distance that the pin hole is spaced from the end of the receiver tube may vary depending on the design of the hitch receiver.

The hitch receiver is adapted to receive a variety of hitch accessories such as a ball mount, a carrier, a rack, and other things that are desirably coupled with the hitch receiver. A hitch accessory has a complementing shaped feature designed to be inserted into the receiver tube and secured in place by a hitch pin that is manually inserted through the pin hole and a hole in the square feature of the hitch accessory that requires alignment with the pin hole. Once the holes are aligned and the pin is in place, a clip or lock is manually applied to retain the pin in position.

Securing the hitch accessory to the hitch receiver requires visual and tactile access to the hitch receiver to align, insert and secure the hitch accessory to the hitch receiver. Often, one individual person may experience difficulty or may be required to endure time consuming steps to accomplish these tasks. Doing so may be particularly challenging when the individual's hands are occupied with handling the hitch accessory and its load and/or when they are positioned remotely from the receiving end of the hitch receiver's tube.

Accordingly, it is desirable to provide helpful and efficient features to assist in coupling a hitch accessory with a hitch receiver. It would also be desirable to accommodate existing receivers to avoid any vehicle modification. Furthermore, other desirable features and characteristics of the present invention will become apparent from the subsequent detailed description and the appended claims, taken in conjunction with the accompanying drawings and the foregoing technical field and background.

SUMMARY

A hitch system may automatically couple a hitch accessory that has an attachment bar assembly with a hitch receiver. In a number of embodiments, the attachment bar assembly includes a housing bar that is tubular, with a pin-hole through the housing bar. A pin-lever is pivotably mounted in the housing bar and includes a pin configured to retract into the housing bar and to extend out of the pin-hole. A ramp-component is disposed in the housing bar and is engageable with the pin-lever. An actuator selectively moves the ramp-component to retract the pin into the housing bar and to extend the pin out of the housing bar, by selectively enabling pivoting of the pin-lever.

In additional embodiments, a lock projection is included on the ramp-component, which is engageable with the pin-lever. The actuator comprises a motor configured to translate the ramp-component to move to lock projection against the pin-lever to lock the pin.

In additional embodiments, a gearset is driven by the actuator and a screw is driven by the gearset. The screw is engaged with the ramp-component for movement of the ramp-component by the actuator through the gearset and the screw.

In additional embodiments, a hole-finder plate is disposed in the housing bar. A protrusion is included on the hole-finder plate and a slot is formed through the housing bar. The protrusion is extendable through the slot. The ramp-component includes a finder-peg and the hole-finder plate includes a finder-tab. The protrusion is moveable by the ramp-component through engagement of the finder-peg with the finder-tab to translate the protrusion through the slot.

In additional embodiments, a wedge is disposed in the housing bar. The ramp-component includes a wedge-ramp engageable with the wedge. A wedge opening is defined through the housing bar. The actuator is configured to translate the ramp-component to move, via the wedge-ramp, the wedge through the wedge opening to jam the hitch system.

In additional embodiments, a jamming block is disposed in the housing bar and the housing bar defines a jamming block opening. The wedge includes a first angled side and the jamming block includes a second angled side configured to interact with the first angled side to simultaneously force the wedge through the wedge opening and the jamming block through the jamming block opening.

In additional embodiments, the attachment bar assembly is configured for receipt in a receiver tube. The receiver tube defines a receiver-hole and the pin is configured for receipt in the receiver-hole.

In additional embodiments, a shaft extends across the inside of the housing bar. The pin-lever pivots about the shaft and includes an arm that carries a retract-peg. The ramp-component includes a retract-ramp that is engageable with the retract-peg to lock the pin in a retracted state inside the housing bar.

In additional embodiments, a controller is configured to operate the actuator. Once the actuator is started, its operation is maintained in an on state until pinning, locking and jamming of the hinge system is complete.

In additional embodiments, a receiver communicates with the controller and is configured to provide inputs to the controller from a remote device.

In a number of other embodiments, a hitch system for use with a vehicle includes a hitch receiver configured to be fixed to the vehicle. The hitch receiver includes a receiving end and includes a receiver-hole spaced form the receiving end. An attachment bar assembly includes a housing bar that is tubular, and a pin-hole extends through the housing bar. The attachment bar assembly is configured to couple with the hitch receiver through the receiving end. A pin-lever is pivotably mounted in the housing bar and includes a pin configured to retract into the housing bar and to extend out of the pin-hole for engaging in the receiver-hole. The pin-lever includes a retract-peg and a ramp-component in the housing bar is engageable with the retract-peg to retract the pin. A motor is configured to move the ramp-component to selectively retract and extend the pin relative to the housing bar, by selectively enabling pivoting of the pin-lever.

In additional embodiments, a lock projection is included on the ramp-component and is engageable with pin-lever.

The motor is configured to translate the ramp-component to move to lock projection against the pin-lever to lock the pin in the receiver-hole.

In additional embodiments, a number of gears are driven by the motor and a screw is driven by the number of gears. The screw is engaged with the ramp-component for movement of the ramp-component by the motor through operation of the number of gears and the screw.

In additional embodiments, a hole-finder plate is disposed in the housing bar and includes a protrusion. A slot is formed through the housing bar and the protrusion is extendable through the slot to engage the receiving end of the receiver tube. The ramp-component includes a finder-peg and the hole-finder-plate includes a finder-tab. The finder-peg is configured to selectively engage the finder-tab to translate the protrusion through the slot.

In additional embodiments, a wedge is disposed in the housing bar. The ramp-component includes a wedge-ramp engageable with the wedge. A wedge opening is defined through the housing bar. The motor is configured to translate the ramp-component to move, via the wedge-ramp, the wedge through the wedge opening and against the receiver tube to jam the hitch system.

In additional embodiments, a jamming block is disposed in the housing bar and the housing bar defines a jamming block opening. The wedge includes a first angled side and the jamming block includes a second angled side configured to interact with the first angled side to simultaneously force the wedge through the wedge opening and against a first wall of the receiver tube, and the jamming block through the jamming block opening and against a second wall of the receiver tube.

In additional embodiments, the attachment bar assembly is configured with a tapered end for receipt in the receiver tube.

In additional embodiments, a shaft extends across an inside of the housing bar. The pin-lever pivots about the shaft, includes a first arm carrying the pin, and includes a second arm carrying a retract-peg. The ramp-component includes a retract-ramp, wherein the retract-ramp is engageable with the retract-peg to retract the pin in a retracted state with the pin inside the housing bar.

In additional embodiments, a controller is configured to operate the motor, and is configured to start the motor and maintain operation of the motor until pinning, locking and jamming of the hinge system is complete. A transceiver communicates with the controller and is configured to provide inputs to the controller from a remote device, and to provide inputs to the remote device from the controller.

In a number of additional embodiments, a hitch system for use with a vehicle includes a hitch receiver configured to be fixed to the vehicle. The hitch receiver includes a receiving end and a receiver-hole that is spaced from the receiving end. An attachment bar assembly includes a housing bar that is tubular, with a pin-hole defined through the housing bar. The attachment bar assembly is configured to couple with the hitch receiver through the receiving end. A pin-lever is pivotably mounted in the housing bar and includes a pin configured to retract into the housing bar and to extend out of the pin-hole for engaging in the receiver-hole. The pin-lever includes a retract-peg. A hole-finder-plate is disposed in the housing bar and includes a protrusion. A slot is formed through the housing bar and the protrusion is extendable through the slot to engage the receiving end of the receiver tube. A ramp-component is disposed in the housing bar and is engageable with the retract-peg. The ramp-component includes a finder-peg and the hole-finder-plate includes a finder-tab. The finder-peg is configured to selectively engage the finder-tab to translate the protrusion through the slot. A motor is configured to move the ramp-component to selectively retract and extend the pin relative to the housing bar, by selectively enabling pivoting of the pin-lever.

DESCRIPTION OF THE DRAWINGS

The exemplary embodiments will hereinafter be described in conjunction with the following drawing figures, wherein like numerals denote like elements, and wherein:

FIG. 2 is a fragmentary side view illustration showing parts of the hitch system of FIG. 1 with the housing shown in transparent dashed-line form, in accordance with various embodiments;

FIG. 3 is a fragmentary top view illustration showing parts of the hitch system of FIG. 1 with the housing shown in transparent dashed-line form, in accordance with various embodiments;

FIG. 8 is a fragmentary, cross sectional illustration of the pin area of the hitch system of FIG. 1 in a hole-finding state and showing the ramp-component in the foreground, in accordance with various embodiments;

FIG. 9 is a fragmentary, cross sectional illustration of the pin area of the hitch system of FIG. 1 in a hole-finding state and showing the hole-finder plate in the foreground, in accordance with various embodiments;

FIG. 10 is a fragmentary, cross sectional illustration of the pin area of the hitch system of FIG. 1 in a hole-finding state and taken behind the hole-finder plate, in accordance with various embodiments;

FIG. 11 is a fragmentary, cross sectional illustration of the pin area of the hitch system of FIG. 1 in a pin-engaged state and showing the ramp-component in the foreground, in accordance with various embodiments;

FIG. 12 is a fragmentary, cross sectional illustration of the pin area of the hitch system of FIG. 1 in a pin-engaged state and showing the hole-finder plate in the foreground, in accordance with various embodiments;

FIG. 13 is a fragmentary, cross sectional illustration of the pin area of the hitch system of FIG. 1 in a pin-engaged state and taken behind the hole-finder plate, in accordance with various embodiments;

DETAILED DESCRIPTION

Figure 1:
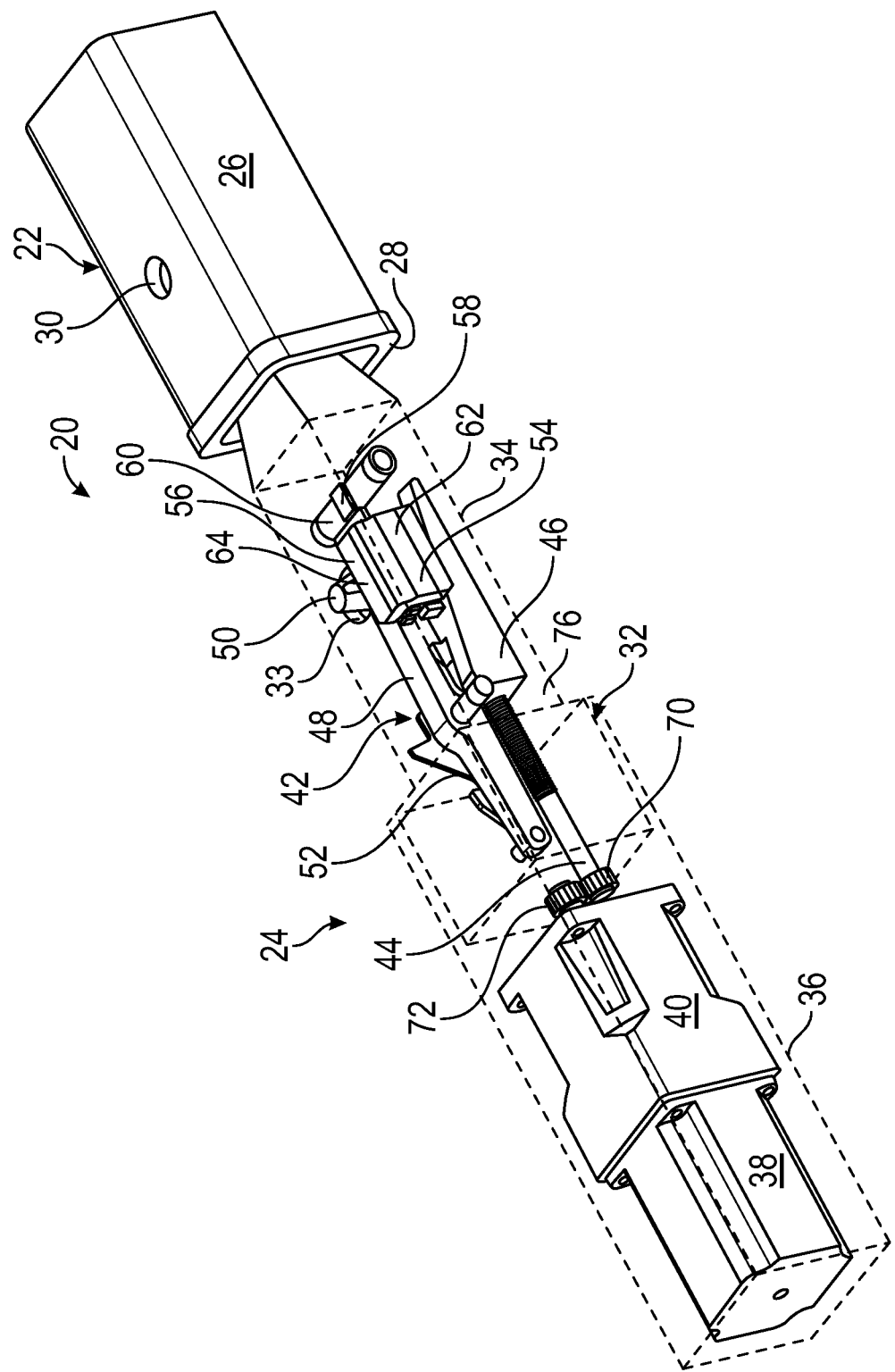
FIG. 1 is a perspective illustration of a hitch system with its housing shown in transparent dashed-line form, in accordance with various embodiments.

The following detailed description is merely exemplary in nature and is not intended to limit the application and uses. Furthermore, there is no intention to be bound by any expressed or implied theory presented in the preceding technical field, background, brief summary or the following detailed description.

As disclosed herein, a hitch system may include a receiver, such as a standard hitch receiver on a vehicle. An automatic hitch mechanism may effect automatic pinning, locking and/or jamming of a hitch accessory to the hitch receiver. In examples described herein, a hitch accessory may be embodied as a cargo carrier. However, a cargo carrier is but one application of the automatic hitch system of this disclosure, and the applicability of the system is not limited to that application. Accordingly, a hitch accessory to which the automatic hitch system is applied may be any conceivable equipment that is desirably coupled with a hitch receiver for any purpose.

In embodiments, a hitch system may include an attachment bar assembly including an automatic hitch mechanism contained in a tubular (i.e. hollow) housing bar. A pin-hole is provided through the housing bar, and the housing is adapted to couple with a hitch receiver that has a complementary receiver-hole for receipt of the pin. In this disclosure the term pin-hole is used to refer to the hole(s) that the hitch pin is received through to couple a hitch accessory's attachment bar assembly to a hitch receiver, without limitation regarding size of the holes. A pin-lever carries the pin and is pivotably mounted in the housing bar. The pin-lever is configured to retract the pin into the housing bar and to extend the pin outward through the pin-hole of the housing bar to engage in the receiver-hole of the hitch receiver. A multi-functional ramp element referred to as a ramp-component, or more simply as a ramp, is disposed in the housing bar. An actuator, which may be a motor, may be carried in, or external to, the housing bar and is configured to move the ramp-component to selectively retract and extend the pin through pivoting of the pin-lever. A hitch system may include a hole-finder plate in the housing bar. The hole-finder plate includes a protrusion that is extendable through a slot in the housing bar and that is engageable with the receiving end of the hitch receiver. The hole-finder-plate includes a finder-tab and the ramp-component includes a finder-peg. The finder-peg is engageable with the finder-tab to translate the protrusion through the slot pushing on the end of the hitch receiver to move the pin to find the receiver-hole in the hitch receiver to effect automatic pinning. The ramp-component may include a projection that is engageable with the pin-lever to lock the pin in the receiver-hole of the hitch receiver and to effect automatic locking. The ramp-component may include a wedge-ramp that is engageable with a wedge to force a jamming block against the inside of the hitch receiver to tightly secure the attachment bar assembly in the hitch receiver to effect automatic jamming. The hitch system may be configured to effect any or all of automatic pinning, automatic locking and/or automatic jamming of a hitch accessory's attachment bar to a hitch receiver.

Referring to FIG. 1, a hitch system 20 generally includes a hitch receiver 22 and a hitch accessory's attachment bar assembly 24. The hitch receiver 22 includes a receiver tube 26 that may be secured to a mobile platform such as a vehicle, or to a stationary structure. The receiver tube 26 is generally of a standard size and shape and includes a receiving end 28 and a receiver-hole 30. The attachment bar assembly 24 includes a housing bar 32 that is tubular/hollow and that includes at least a segment 34 that is sized to be readily received in the receiver tube 26. The housing bar 32 has a tapered lead-in end to assist in locating and inserting into the receiver tube 26. In the current embodiment, the housing bar 32 includes the segment 34 and a larger sized segment 36 housing an actuator, in this embodiment a motor 38 and a gearbox 40. The motor 38 may be any type of electric motor and in the current embodiment a DC stepper motor is used and is sized to generate sufficient torque when coupled with the gearbox 40 to drive the system. The gearbox 40 includes a set of internal gears designed to multiply the torque generated by the motor 38 as needed for the application. The motor 38 and the gearbox 40 are part of an automatic hitch mechanism 42, which also includes (in-general), a gearset, a drive-screw 44, a ramp-component 46, a pin-lever 48 with a pin 50, a hole-finder-plate 52, a two-part jamming system including a wedge 54 and a jamming block 56, a spring 58 and a spring support 60. As shown in FIG. 1, the pin 50 is shown extending out of the housing bar 32 through the pin-hole 33 for visibility, but will usually only be disposed in that position when the housing bar 32 is positioned and aligned in the receiver tube 26 with the pin 50 in the receiver-hole 30. Also shown in FIG. 1, the wedge 54 and jamming block 56 are configured to engage two sides of the receiver tube 26 by surfaces 62 and 64, respectively.

Figure 4:
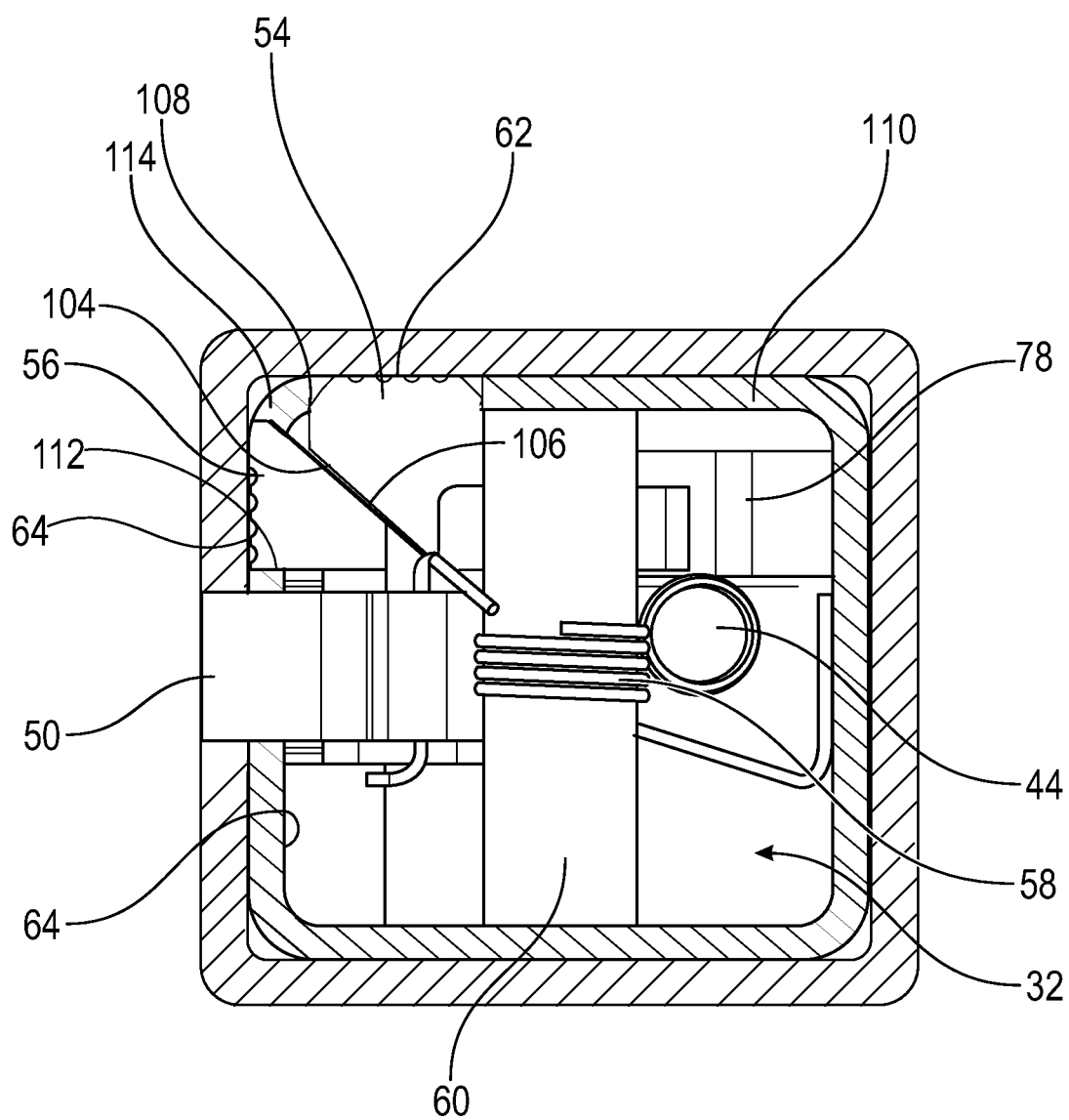
FIG. 4 is a fragmentary end view illustration showing parts of the hitch system of FIG. 1, in accordance with various embodiments.

As shown in side, top, and end views of FIGS. 2-4 respectively, the gearbox 40 is coupled with the drive-screw 44 through a gearset including gears 70 and 72. In some embodiments, the gearbox 40 and/or the motor 38 may be disposed outside the housing bar 32 and may be either fixed to the housing bar 32 or releasably coupled therewith. In some embodiments the gearbox 40 may be omitted with sufficient torque multiplication provided by the gears 70 and 72. In some embodiments, the drive-screw 44 may be replaced by a linear actuator or other device capable of translating the ramp-component 46. In this embodiment, the drive-screw 44 is threaded into the ramp-component 46 so that the ramp-component 46 is bi-directionally translatable through operation of the motor 38, the gearbox 40, the gears 70, 72 and the drive-screw 44.

The ramp-component 46 includes a base 74 that rides on a wall 76 of the housing bar 32. A wedge-ramp 78 extends away from the wall 76 from one side of the base 74, and a retract-ramp 80 extends away from the wall 76 from another side of the base 74. Near the retract-ramp 80, the ramp-component 46 carries a finder-peg 82. As best visualized in FIG. 2, the retract-ramp 80 is relatively thin for example, the same thickness as the material of the base 74, while the wedge-ramp 78 is relatively thick for engagement with the wedge 54. For example, the wedge-ramp 78 may include a bent section of the material of the base 74 or may include a separate attached part. Both the retract-ramp 80 and the wedge-ramp 78 are out of alignment with the body of the pin-lever 48 so as to not inhibit its pivoting movement. The pin-lever 48 pivots about a shaft 86 that is fixed at both ends to the housing bar 32 and that extends across the inside of the housing bar. The pin-lever 48 includes an arm 88 that carries the pin 50 and an arm 90 that carries a retract-peg 84. The pin lever is biased counterclockwise as viewed in FIG. 3, by the spring 58. The spring 58 is wrapped around the spring support 60 and engages the arm 88 and the wall 76.

The hole-finder-plate 52 includes an elongated opening 94 that receives the retract-peg 84 and an elongated opening 96 through which the shaft 86 extends. As such, the hole-finder-plate 52 may translate relative to the pin-lever 48 for the lengths of the elongated openings 94, 96, which are equal in length with each other. The hole-finder-plate generally pivots with the pin-lever 48. The hole-finder-plate 52 includes a protruding feature referred to as a protrusion 98 that extends outward through a slot 100 in the housing bar 32, and a finder-tab 102 that extends in an opposite direction relative to the protrusion 98.

As best seen in FIG. 4, the wedge 54 is engageable with the wedge-ramp 78, includes the surface 62 and includes an angled side 104 engaging a complementarily angled side 106 of the jamming block 56. When the wedge-ramp 78 forces the wedge 54 against the jamming block 56, the angled sides 104, 106 cause the surface 62 to be forced through a wedge opening 108 in a wall 110 of the housing bar 32 and the surface 64 of the jamming block 56 to be forced through a jamming block opening 112 in another wall 114 of the housing bar 32 providing bi-directional securement.

Figure 6:
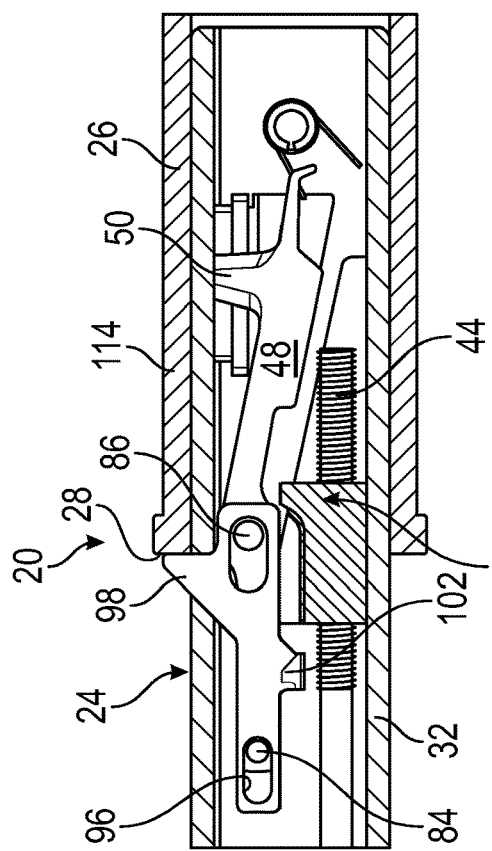
FIG. 6 is a fragmentary, cross sectional illustration of the pin area of the hitch system of FIG. 1 in a pin-retracted state and showing the ramp-component in the foreground, in accordance with various embodiments.
Figure 5:
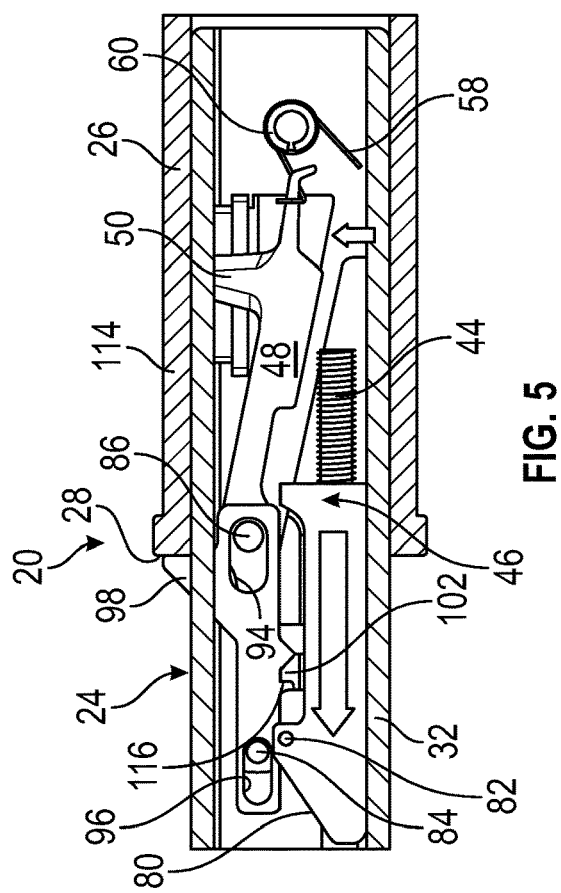
FIG. 5 is a fragmentary, cross sectional illustration of the pin area of the hitch system of FIG. 1 in a pin-retracted state and showing the hole-finder ramp in the foreground, in accordance with various embodiments.
Figure 7:
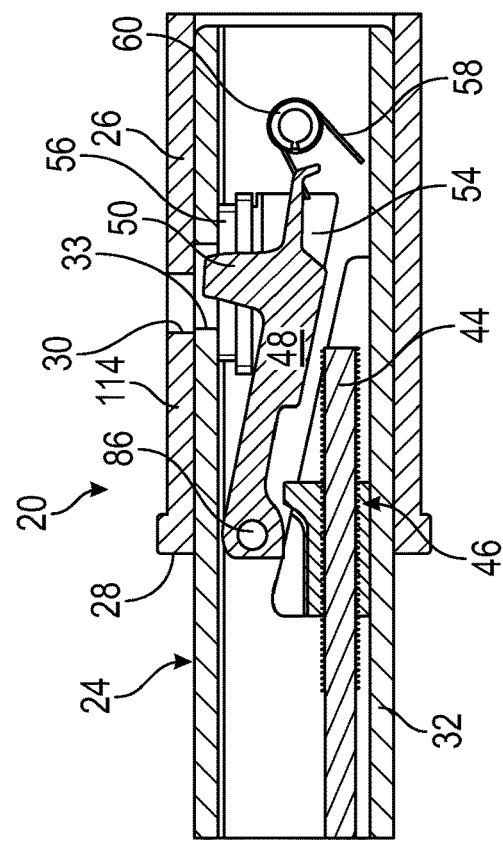
FIG. 7 is a fragmentary, cross sectional illustration of the pin area of the hitch system of FIG. 1 in a pin-retracted state and taken behind the hole-finder plate, in accordance with various embodiments.

Referring to FIGS. 5-7 part of the hitch system 20 is illustrated in a retracted state with the pin 50 retracted into the housing bar 32 and the wedge 54 and jamming block 56 unjammed. The ramp-component 46 is fully driven in the direction of the gearbox 40. The attachment bar assembly 24 is shown fully inserted into the receiver tube 26 with the protrusion 98 positioned against the receiving end 28. Because different manufacturers/hitch receiver designs locate the receiver-hole 30 in a laterally centered position on the wall 114 but at different distances from the receiving end 28, the protrusion 98 is designed and constructed so that the pin 50 resides inside the receiver tube 26 further/deeper than all known receiver-hole locations, when the protrusion 98 is positioned against the receiving end 28. Accordingly, the hitch system 20 works with all known hitch receiver designs.

In the retract state, the retract-ramp 80 has driven the retract-peg 84 to the maximum extent toward the wall 114 of the housing bar 32, which causes the pin-lever 48 to be held in a clockwise (as viewed) direction against the force of the spring 58 holding the pin 50 inside the housing bar 32. As best seen in FIG. 7, the end of the pin 50 does not project out of the pin-hole 33 so as to not hit the receiver tube 26 when inserted. The shaft 86 is positioned at the pin-side end of the elongated opening 94 and the retract-peg 84 is positioned against the pin-side end of the elongated opening 96. As best seen in FIG. 5, the finder-tab 102 includes a curved surface 116 for capturing and engaging the finder-peg 82 as the ramp-component 46 moves. In the retracted state, the hitch system is ready for hole-finding.

Referring to FIGS. 8-10, the hitch system 20 has entered a searching state/hole-finding mode. The motor 38 is operated to drive the ramp-component 46 in a direction away from the gearbox 40 (to the right as viewed). The retract-ramp 80 disengages from the retract peg 84, which allows the pin-lever 48 to rotate (counter-clockwise as viewed) moving the pin 50 outward through the pin-hole 33 and against the wall 114 under the force of the spring 58. The shaft 86 begins to move away from the pin-side end of the elongated opening 94 and the retract-peg 84 moves away from the pin-side end of the elongated opening 96. As the ramp-component 46 moves, the finder-peg 82 engages the finder-tab 102 against the curved surface 116 engaging the ramp-component 46 with the hole-finder-plate 52. With the protrusion 98 positioned against the receiving end 28 of the receiver tube 26 and with the ramp-component 46 engaged with the hole-finder-plate 52, the power of the motor 38, through the gearbox 40, the gears 70, 72 and the drive-screw 44 moves the housing bar 32 to slide out of the receiver tube 26. Because the pin-lever 48 is attached to the housing bar through the shaft 86, the pin 50 moves with the housing bar 32. As best seen in FIG. 10, the pin 50 rides along the wall 114 of the receiver tube 26 in preparation for alignment with the receiver-hole 30.

As shown in FIGS. 11-13, the hitch system 20 has entered the pinned state where the pin 50 is aligned with the receiver-hole 30. Under the force of the spring 58, the pin-lever 48 is rotated and the pin 50 is moved outward through the pin-hole 33 and into the receiver-hole 30 as best seen in FIG. 13. Rotation of the pin-lever 48 rotates the hole-finder-plate 52 and the protrusion 98 is disengaged from the receiving end 28 of the receiver tube 26. Rotation of the hole-finder-plate 52 also disengages the finder-peg 82 from the finder-tab 102 as best seen in FIG. 12, allowing the ramp-component 46 to continue to move in the direction away from the gearbox 40.

Figure 14:
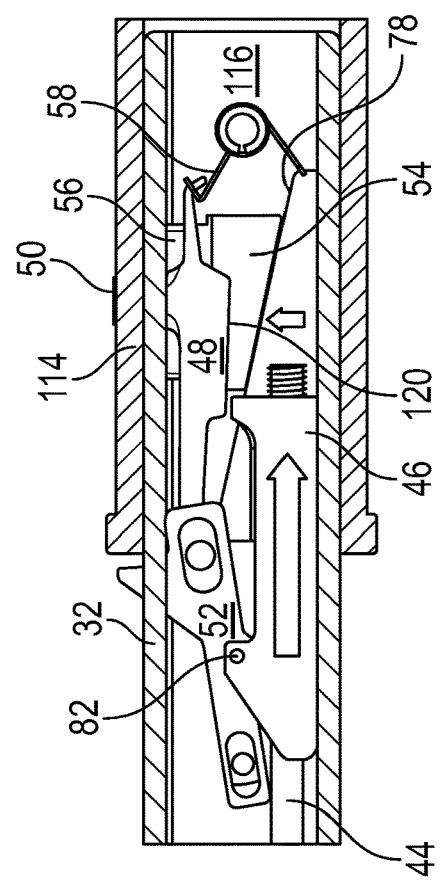
FIG. 14 is a fragmentary, cross sectional illustration of the pin area of the hitch system of FIG. 1 in a locked state and showing the ramp-component in the foreground, in accordance with various embodiments.
Figure 15:
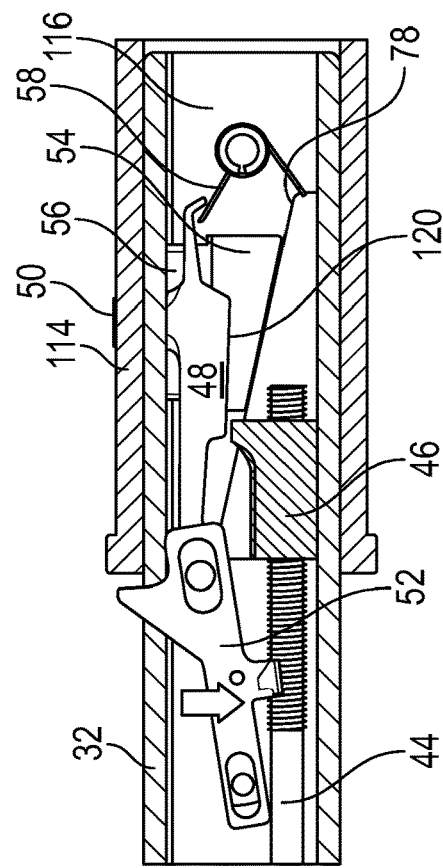
FIG. 15 is a fragmentary, cross sectional illustration of the pin area of the hitch system of FIG. 1 in a locked state and showing the hole-finder plate in the foreground, in accordance with various embodiments.
Figure 16:
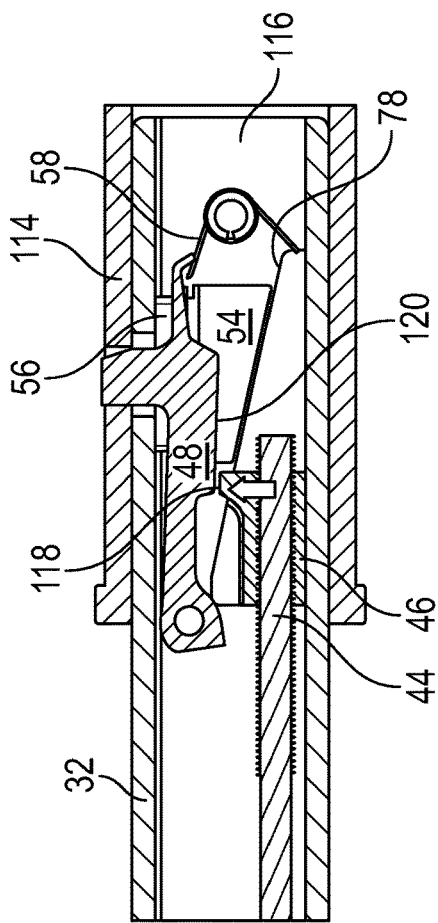
FIG. 16 is a fragmentary, cross sectional illustration of the pin area of the hitch system of FIG. 1 in a locked state and taken behind the hole-finder plate, in accordance with various embodiments.

The locked and jammed state is illustrated in FIGS. 14-16 with the pin 50 locked and the wedge 54 and jamming block 56 jammed. The ramp-component 46 includes a projection 118 that extends toward the wall 114 and that is engaged with an extension 120 of the pin-lever 48. The projection 118 mechanically locks the pin-lever 48 in position and locks the pin 50 in the receiver-hole 30. The ramp-component 46 continues to move and the wedge-ramp 78 engages the wedge 54 forcing it toward the wall 110. The angled sides 104, 106 (FIG. 4), act to force the wedge 54 against the wall 110 and simultaneously, to force the jamming block 56 against the wall 114. This securely jams the attachment bar assembly 24 in the receiver tube 26.

Figure 17:
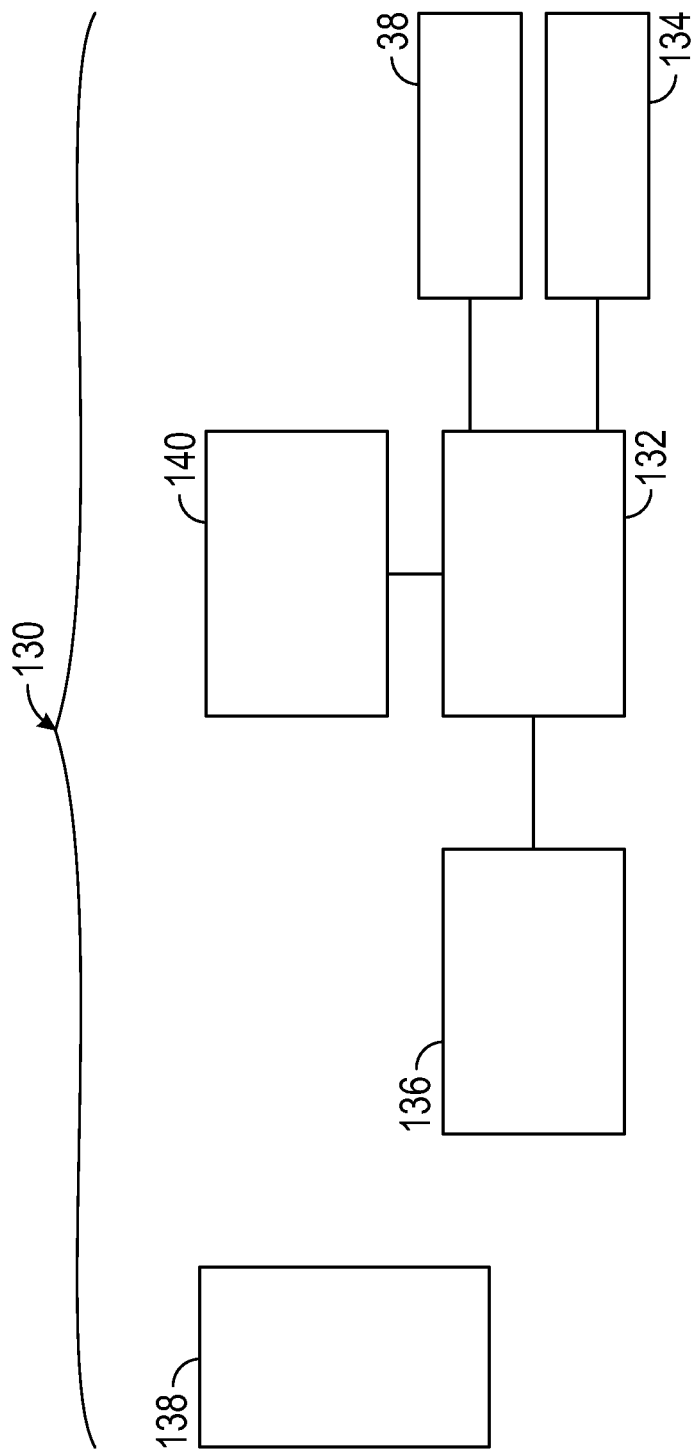
FIG. 17 is a diagram of a control system of the hitch system of FIG. 1, in accordance with various embodiments.

A diagram of a control system 130 of the hitch system 20 is illustrated in FIG. 17. The motor 38 is operated by a controller 132. In general, the controller 132 accepts information from various sources, process that information, and provide control commands based thereon to operate the motor 38. The controller 132 may include a processor, a memory device, and a storage device. The controller 132 may be programmed with executable instructions used in processing information and in controlling the hitch system 20. The controller 132 may receive signals from a sensor or sensors 134 of the hitch system 20. The sensor(s) 134 includes one or more sensing devices that sense observable conditions of the hitch system 20. In a number of embodiments, the sensor(s) 134 may include a torque sensor that monitors torque on the motor 38. The controller 132 may be programmed to stop the motor 38 when the hitch system is locked and jammed. In other embodiments, a current sensor may be used to indicate a locked and jammed state. In some embodiments, the sensor(s) 134 may include a position sensor or a force sensor to confirm the protrusion 98 is positioned against the receiving end 28 of the receiver tube 26 to confirm the attachment bar assembly 24 is fully inserted before operating the motor 38.

The control system 130 may include an operator interface 136 coupled with the controller 132. In an embodiment, the operator interface 136 is a tethered device and may include a button to initiate operation of the motor 38 in a rotational direction to hole-find, pin, lock and jam the hitch system 20 and may include another button to unjam, unlock, and unpin the hitch system, 20, operating the motor in an opposite rotational direction. In either case, one input initiation effects complete operation.

In a number of embodiments, the operator interface 136 may be supplemented with, or replaced by, a remote, such as a remote wireless device 138. A receiver and/or a transmitter, which may be in the form of a transceiver 139, are coupled with the controller 132 for communicating with the remote wireless device 138. The remote wireless device 138 may be a mobile (cellular) handheld, such as a smartphone, or other connected electronic device. In some embodiments, the remote wireless device 138 may be a dedicated device, such as a short-range radio transmitter, tailored to communicate with the transceiver 139. Regardless of whether a tethered or remote wireless device is used to communicate with an operator, the controller may provide feedback. For example, the controller 132, through the operator interface 136 and/or the remote wireless device 138 may inform the operator that the hitch system is fully pinned, locked and jammed. In another example, the operator may be informed if a failure in pinning, locking and/or jamming has occurred. In another example, the operator may be informed when/if unjamming, unlocking and/or unpinning is successful.

Figure 19:
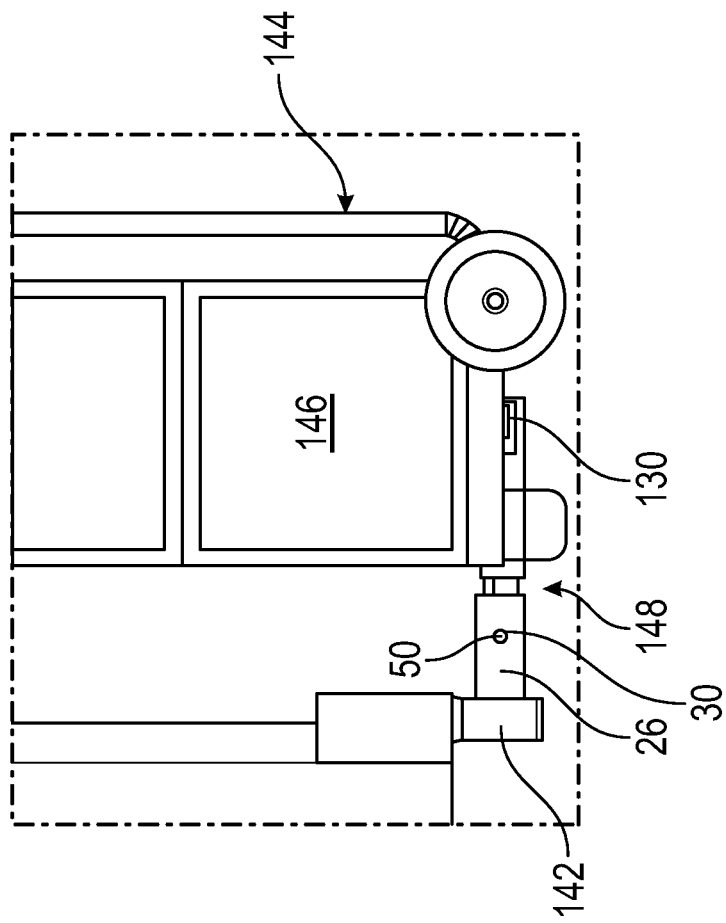
FIG. 19 is a schematic illustration of a cargo carrier application of the hitch system of FIG. 1 in a loaded state, in accordance with various embodiments.
Figure 18:
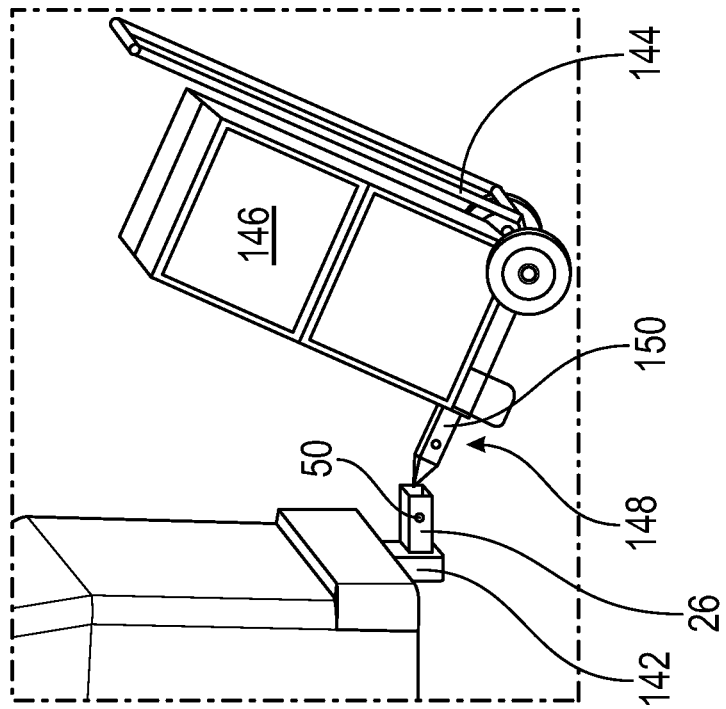
FIG. 18 is a schematic illustration of a cargo carrier application of the hitch system of FIG. 1 in a disengaged state, in accordance with various embodiments.

A nonlimiting application of the hitch system 20 is illustrated in FIGS. 18-19, to which reference is directed. A vehicle 140 carries the receiver tube 26, which is attached to the vehicle 140 through a hitch receiver frame 142. The receiver-hole 30 is positioned on a side of the receiver tube 26, as is normal. The receiving end 28 of the receiver tube 26 is presented facing away from the vehicle 140. The attachment bar assembly 24 is affixed to a cargo cart 144 carrying a load of cargo 146 as a hitch accessory 148. In this embodiment the vehicle 140, or multiple vehicles, may be used repeatedly and often for transporting a number of such hitch accessories 148. The control system 130 is carried on the hitch accessory 148 and specifically the cargo cart 144.

The cargo cart 144 is manually wheeled to the vehicle 140 and the attachment bar assembly 24 is directed into the receiver tube 26. The attachment bar assembly has a tapered end 150 to assist in finding the receiver tube 26. This feature is helpful including when the cargo 146 may obstruct the operators view. When the tapered end 150 is positioned in the receiver tube 26, the operator lifts and pushes the cart 144 and the attachment bar assembly 24 toward the vehicle 140 until it stops moving. The outside of the housing bar 32 may include a low-friction coating to assist in sliding. When pushed forward until stopping as shown in FIG. 19, the cart 144 is suspended for transport and the protrusion 98 is against the receiving end 28 of the receiver tube 26 as shown in FIG. 5. At this point, the hitch system is ready for pinning, locking and jamming as described above. In other embodiments, the cargo cart 144 may be any hitch accessory and the receiver tube 26 may be mounted to any desirable point, including to a fixed point on immobile infrastructure.

Accordingly, an automatic hitch system effects automatic pinning, automatic locking and/or automatic jamming of a hitch accessory to a hitch receiver. The automatic hitch system assists in coupling hitch accessories such as hitch-mounted cargo carriers to vehicle hitch receivers. The system may be controlled and securely locked with a remote controller such as a mobile phone or other device. After inserting the cargo carrier attachment bar into the vehicle hitch receiver, the system may be activated with the remote. The electronically controlled mechanism searches for the receiver-hole, engages and locks the pin, and pushes a wedge against the receiver wall to secure the attachment bar and its hitch accessory to the hitch receiver. A message may be delivered to confirm the system is locked and secure. Removal of the hitch accessory is accomplished by reversing the wedge and the pin, under control from the remote device. Additionally, a hitch receiver may be secured to building or ground infrastructure, allowing the hitch accessory with the automatic hitch system to be securely locked in a potentially public facing environment to prevent its movement/removal.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A hitch system comprising:
   an attachment bar assembly including a housing bar that is tubular, with a pin-hole through the housing bar;
   a pin-lever pivotably mounted in the housing bar, the pin-lever including a pin configured to retract into the housing bar and to extend out of the pin-hole;
   a ramp-component in the housing bar that is engageable with the pin-lever; and
   an actuator configured to move the ramp-component to selectively retract and extend the pin relative to the housing bar, by selectively enabling pivoting of the pin-lever,
   wherein the ramp-component is configured to engage the pin-lever to lock the pin.

2. The hitch system of claim 1, comprising a lock projection on the ramp-component, wherein the lock projection is engageable with the pin-lever, wherein the actuator comprises a motor configured to translate the ramp-component to move the lock projection against the pin-lever to lock the pin.

3. The hitch system of claim 1, comprising a gearset driven by the actuator and a screw driven by the gearset, wherein the screw is engaged with the ramp-component for movement of the ramp-component by the actuator through the gearset and the screw.

4. The hitch system of claim 1, comprising a hole-finder plate in the housing bar with a protrusion on the hole-finder plate, wherein a slot is formed through the housing bar, wherein the protrusion is extendable through the slot, wherein the ramp-component includes a finder-peg and the hole-finder plate includes a finder-tab, wherein the protrusion is moveable by the ramp-component by engagement of the finder-peg with the finder-tab to translate the protrusion through the slot.

5. The hitch system of claim 1, comprising a wedge in the housing bar, wherein the ramp-component includes a wedge-ramp engageable with the wedge, wherein a wedge opening is defined through the housing bar, and wherein the actuator is configured to move the ramp-component to move, via the wedge-ramp, the wedge through the wedge opening to jam the hitch system.

6. The hitch system of claim 5, comprising a jamming block in the housing bar, wherein the housing bar defines a jamming block opening, wherein the wedge includes a first angled side and the jamming block includes a second angled side configured to interact with the first angled side to simultaneously force the wedge through the wedge opening and the jamming block through the jamming block opening.

7. The hitch system of claim 1, comprising a receiver tube, wherein the attachment bar assembly is configured for receipt in the receiver tube, wherein the receiver tube defines a receiver-hole, wherein the pin is configured for receipt in the receiver-hole.

8. The hitch system of claim 1, comprising a shaft extending across an inside of the housing bar, wherein the pin-lever pivots about the shaft and includes an arm with a retract-peg, wherein the ramp-component includes a retract-ramp, wherein the retract-ramp is engageable with the retract-peg to retract the pin into a retracted state.

9. The hitch system of claim 1, comprising a controller configured to operate the actuator, wherein the controller is configured to start the actuator and maintain operation of the actuator until pinning, locking and jamming of the hitch system is complete.

10. The hitch system of claim 9, comprising a receiver communicating with the controller, wherein the receiver is configured to provide inputs to the controller from a remote device.

11. A hitch system for use with a vehicle, the hitch system comprising:
- a hitch receiver configured to be fixed to the vehicle, the hitch receiver including a receiving end and a receiver-hole spaced form the receiving end;
- an attachment bar assembly including a housing bar that is tubular, with a pin-hole through the housing bar, wherein the attachment bar assembly is configured to couple with the hitch receiver through the receiving end;
- a pin-lever pivotably mounted in the housing bar, the pin-lever including a pin configured to retract into the housing bar and to extend out of the pin-hole for engaging in the receiver-hole, and the pin-lever including a retract-peg;
- a ramp-component in the housing bar, wherein the ramp-component is engageable with the retract-peg; and
- a motor configured to move the ramp-component to selectively retract and extend the pin relative to the housing bar, by selectively enabling pivoting of the pin-lever.

12. The hitch system of claim 11, comprising a lock projection on the ramp-component, wherein the lock projection is engageable with the pin-lever, wherein the motor is configured to move the ramp-component to move the lock projection against the pin-lever to lock the pin in the receiver-hole.

13. The hitch system of claim 11, comprising a number of gears driven by the motor and a screw driven by the number of gears, wherein the screw is engaged with the ramp-component for movement of the ramp-component by the motor through the number of gears and the screw.

14. The hitch system of claim 11, comprising a hole-finder plate in the housing bar with a protrusion on the hole-finder plate, wherein a slot is formed through the housing bar, wherein the protrusion is extendable through the slot to engage a receiving end of a receiver tube, wherein the ramp-component includes a finder-peg and the hole-finder-plate includes a finder-tab, wherein the finder-peg is configured to selectively engage the finder-tab to translate the protrusion through the slot.

15. The hitch system of claim 11, comprising a wedge in the housing bar, wherein the ramp-component includes a wedge-ramp engageable with the wedge, wherein a wedge opening is defined through the housing bar, and wherein the motor is configured to move the ramp-component to move, via the wedge-ramp, the wedge through the wedge opening and against a receiver tube to jam the hitch system.

16. The hitch system of claim 15, comprising a jamming block in the housing bar, wherein the housing bar defines a jamming block opening, wherein the wedge includes a first angled side and the jamming block includes a second angled side configured to interact with the first angled side to simultaneously force the wedge through the wedge opening and against a first wall of the receiver tube, and the jamming block through the jamming block opening and against a second wall of the receiver tube.

17. The hitch system of claim 11, wherein the attachment bar assembly is configured with a tapered end for receipt in a receiver tube.

18. The hitch system of claim 11, comprising a shaft extending across an inside of the housing bar, wherein the pin-lever pivots about the shaft, includes a first arm carrying the pin, and includes a second arm carrying the retract-peg, wherein the ramp-component includes a retract-ramp, wherein the retract-ramp is engageable with the retract-peg to retract the pin into a retracted state with the pin inside the housing bar.

19. The hitch system of claim 11, comprising a controller configured to operate the motor, wherein the controller is configured to start the motor and maintain operation of the motor until pinning, locking and jamming of the hitch system is complete, and comprising a transceiver communicating with the controller, wherein the transceiver is configured to provide inputs to the controller from a remote device, and the controller is configured to provide inputs to the remote device through the transceiver.

20. A hitch system for use with a vehicle, the hitch system comprising:
- a hitch receiver configured to be fixed to the vehicle, the hitch receiver including a receiving end and a receiver-hole spaced from the receiving end;
- an attachment bar assembly including a housing bar that is tubular, with a pin-hole through the housing bar, wherein the attachment bar assembly is configured to couple with the hitch receiver through the receiving end;
- a pin-lever pivotably mounted in the housing bar, the pin-lever including a pin configured to retract into the housing bar and to extend out of the pin-hole for engaging in the receiver-hole, and the pin-lever including a retract-peg;
- a hole-finder-plate in the housing bar with a protrusion on the hole-finder-plate, wherein a slot is formed through the housing bar, wherein the protrusion is extendable through the slot to engage the receiving end of the hitch receiver
- a ramp-component in the housing bar, wherein the ramp-component is engageable with the retract-peg, wherein the ramp-component includes a finder-peg and the hole-finder-plate includes a finder-tab, wherein the finder-peg is configured to selectively engage the finder-tab to translate the protrusion through the slot; and a motor configured to move the ramp-component to selectively retract and extend the pin relative to the housing bar, by selectively enabling pivoting of the pin-lever.

\* \* \* \* \*